United States Patent [19]

Bhagavatula

[11] Patent Number: 4,953,947
[45] Date of Patent: Sep. 4, 1990

[54] DISPERSION TRANSFORMER HAVING MULTICHANNEL FIBER

[75] Inventor: Venkata A. Bhagavatula, Big Flats, N.Y.

[73] Assignee: Corning Incorporated, Corning, N.Y.

[21] Appl. No.: 894,575

[22] Filed: Aug. 8, 1986

[51] Int. Cl.$^5$ ............................................. G02B 6/22
[52] U.S. Cl. ...................... 350/96.33; 350/96.15; 350/96.18; 350/96.3
[58] Field of Search ............... 350/96.15, 96.16, 96.18, 350/96.24, 96.27, 96.29, 96.30, 96.33

[56] References Cited

U.S. PATENT DOCUMENTS

| | | | |
|---|---|---|---|
| 3,669,789 | 6/1972 | Utsugi et al. | 350/96.27 X |
| 4,000,416 | 12/1976 | Goell | 350/96.3 X |
| 4,436,368 | 3/1984 | Keck | 350/96.33 |
| 4,465,336 | 8/1984 | Huber et al. | 350/96.29 X |
| 4,484,795 | 11/1984 | Byron | 350/96.15 X |
| 4,640,585 | 2/1987 | Nojiri | 350/96.12 X |

FOREIGN PATENT DOCUMENTS 0067972 12/1982 European Pat. Off. ......... 350/96.15

Primary Examiner—John D. Lee
Assistant Examiner—John Ngo
Attorney, Agent, or Firm—William J. Simmons, Jr.

[57] ABSTRACT

An optical transmission system wherein light is transmitted from a transmitter to a receiver by at least one transmission optical fiber. The system includes a dispersion transformer which receives light from one of the components, compensates for or transforms the delay distortion of the various wavelengths transmitted through the system, and provides the next component in the system with a compensated or transformed light beam. The dispersion transformer comprises means for receiving light from one of the components and dispersing/separating the light into the plurality of spatially separated beams which are directed onto the endface of a multimode optical fiber. The position of each beam on that end-face is a function of the velocity with which the light that forms the beam propagates through the transmission optical fiber. The multimode fiber is characterized in that it comprises a plurality of light-conducting channels, adjacent ones of which are separated by cladding regions having refractive indices lower than those of the adjacent light-conducting channels.

8 Claims, 3 Drawing Sheets

DISPERSION TRANSFORMER HAVING MULTICHANNEL FIBER

CROSS-REFERENCES TO RELATED APPLICATIONS

This application is related to my copending U.S. patent application Ser. No. 894,579 entitled "Optical Fiber Dispersion Transformer" (V. A. Bhagavatula-5), now U.S. Pat. No. 4,768,853, and Ser. No. 894,631 entitled "Optical Fiber Dispersion Compensator" (V. A. Bhagavatula-6), now U.S. Pat. No. 4,750,802, both filed on even date herewith.

Background of the Invention

The present invention relates to the transformation or modification of dispersion in optical fiber transmission systems.

In single mode fibers, the delay time and hence dispersion, depends on wavelength. In general, light sources such as laser diodes have multiple wavelengths, and these different wavelengths travel at different speeds when propagating through a single-mode fiber. This leads to pulse broadening which depends on the source spectral width, the fiber dispersion and the length of the fiber. This pulse broadening can cause power to spread from one bit into an adjacent bit in a bit stream, an occurrence that can cause an error. The bit rate is therefore limited to that value beyond which bit error ratio is unacceptable. Initially, the procedure to overcome this problem was to put limitations on (a) the fiber dispersion, (b) the source wavelength and its spectral width and (c) the product of the bit rate times the repeater span length. These limitations can be relaxed if the delay differences introduced in the system can be compensated.

A system for compensating for dispersion in a single-mode system is disclosed in French Patent Publication No. 2,535,555. That system comprises a monochromator, an array of optical fiber delay lines and an optical signal detector. In a conventional manner, an optical signal generated by a source such as a laser diode is coupled to and transmitted through a single-mode transmission fiber. The monochromator receives the output light from the optical transmission fiber and spatially separates each longitudinal mode of the source. Each mode is injected into one of the short multimode fibers of the delay line array. The length of each short fiber is adjusted to compensate exactly the corresponding delay time induced in the link by its total chromatic dispersion. The ends of the short, delay line fibers converge on the photodetector.

It is not always desirable to minimize dispersion and maximize bandwidth. For example, a customer may purchase the sole use of a single-mode optical fiber transmission line and connect its own terminal equipment thereto. The price for using the transmission line may be based on the maximum data rate that the customer intends to transmit. The bandwidth of the single-mode fiber transmission line may be much greater than that currently needed by the customer. A dispersion transformer similar to that disclosed in the aforementioned French Patent Publication No. 2,535,555 can be employed to limit the bandwidth of the transmission line to that bandwidth for which the customer pays. This can be accomplished by utilizing the fiber delay line array to delay certain wavelengths received from the monochromator with respect to other wavelengths received therefrom so that the output pulse from the dispersion transformer is wider than the input thereto.

The term "dispersion transformer" as used herein refers to those systems which minimize or decrease dispersion as well as those which increase dispersion.

In my aforementioned copending U.S. patent application Ser. No. 894,579 (V. A. Bhagavatula-5), U.S. Pat. No. 4,768,853, the function of the optical fiber delay line array is performed by a single multimode optical fiber. The plurality of spatially separated beams is directed onto the endface of the multimode optical fiber. The position on each beam on the endface of the multimode fiber is a function of the velocity with which the light that forms the beam propagates through the transmission optical fiber. The multimode fiber is characterized by a refractive index profile and a shape which are such that the modes excited therein are propagated therethrough with appropriate delays to generate an output pulse of desired width. Dispersion can thus be reduced or increased. Light emanating from the multimode fiber is coupled to the next adjacent component of the system.

Summary of the Invention

It is an object of the present invention to provide a dispersion transformer in which the spatially separated wavelength beams are delayed by propagation through a single multimode fiber. Another object is to provide a dispersion transformer which utilizes a multimode delay fiber which enables a very selective excitation of modes.

The system of the present invention is of the type that conventionally comprises a light source, a light detector, at least one transmission optical fiber connected between the source and detector, and a dispersion transformer disposed between any two of the aforementioned components. The dispersion transformer is characterized in that it comprises means for receiving light from one of the aforementioned components and dispersing or separating the light into a plurality of spatially separated beams. The position of each beam is a function of the velocity with which the light that forms the beam travels through the transmission optical fiber. The plurality of beams are directed onto a portion of an input endface of a multimode delay optical waveguide, thus initiating in the multimode waveguide the propagation of a plurality of modes which are propagated therethrough at various velocities. The multimode waveguide is characterized in that it comprises a plurality of discrete light-conducting channels separated by regions of cladding material having a refractive index lower than that of the channels. The functions of dispersing light and directing the resultant beams can be performed by the same or different devices.

The above-described dispersion transformer is capable of functioning in either of two completely different modes. To minimize dispersion, those wavelengths of light which are propagated through the transmission fiber with the greatest delay are transmitted through the multimode delay waveguide with the least delay and those wavelengths of light which are propagated through the transmission fiber with the least delay are propagated through the multimode delay waveguide with the greatest delay. To increase dispersion, those wavelengths of light which are propagated through the transmission fiber with the greatest delay are preferably delayed even further by the multimode waveguide. The light emanating from the multimode waveguide is coupled to the next adjacent component of the system.

The multimode delay optical waveguide can be a fiber or a planar waveguide. Since relatively high values of $\Delta$ can be achieved in planar waveguides, relatively short lengths are needed. The term "$\Delta$" is used in a conventional manner to indicate the relative refractive index difference between a light conducting channel and the cladding layer. Various types of multimode delay optical fibers can be employed such as azimuthally symmetrical fibers and slab-type fibers. Various cross-sectional configurations including rectangular can be used. Adjacent ones of the light-conducting channels can have the same refractive index, or they can have different refractive indices. Also, all of the cladding regions can have the same refractive index, or they can have different refractive indices. The refractive index profiles of the channels can be graded so that all modes are propagated through that channel with substantially the same delay. Adjacent channels can have equal or nonequal thicknesses.

DETAILED DESCRIPTION

Figure 1:
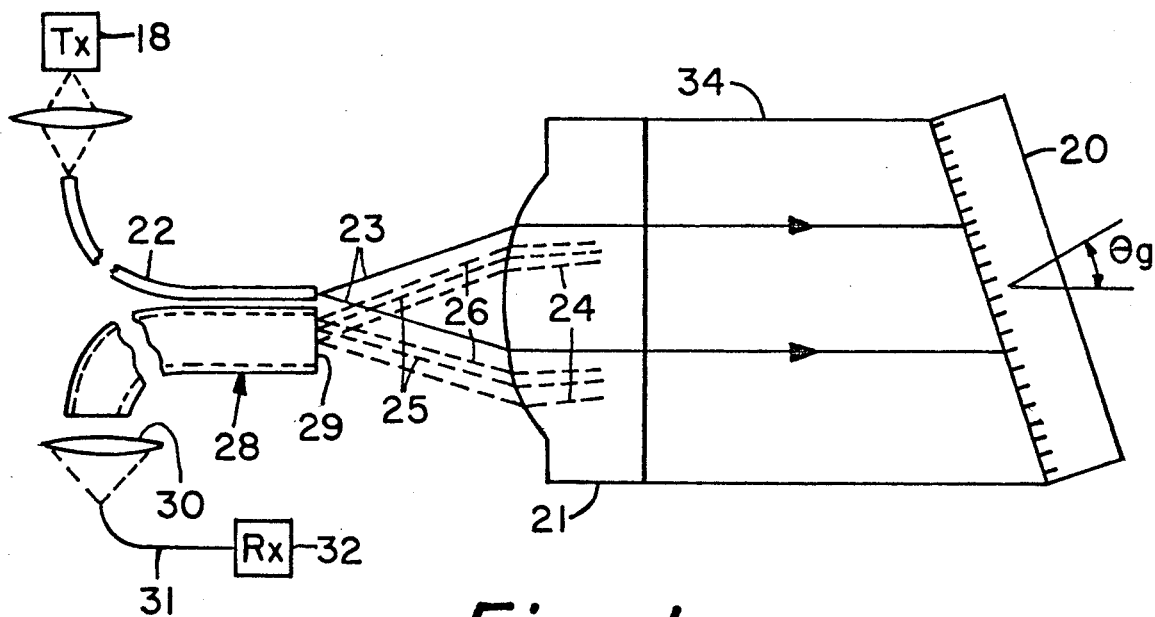
FIG. 1 is a schematic illustration of the dispersion transformer of the present invention.

The dispersion transformer of the present invention is shown in FIG. 1. Light from a transmitter 18 such as a laser diode, LED or the like is propagated through transmission optical fiber 22 which may comprise a single-mode or multimode fiber. In single-mode fibers, for example, the delay time and hence dispersion, depends upon wavelength. In general, laser diode sources emit light at multiple wavelengths and these different wavelengths travel at different speeds through fiber 22. If fiber 22 were coupled directly to detector or receiver 32, the output pulse fed to the receiver would be broadened to an extent depending upon the source spectral width, the fiber dispersion and the length of fiber 22.

In accordance with one aspect of the present invention, this pulse broadening is minimized by introducing a dispersion transformer into the system. The dispersion transformer may be connected between transmission fiber 22 and detector 32, as shown in FIG. 1, or it could be connected between source 18 and fiber 22. If two or more transmission fibers were connected in series, a dispersion transformer could be connected between two such fibers. The dispersion transformer comprises a reflecting grating 20 which is disposed in near "Littrow" arrangement. The grating is blazed for operation at the system operating wavelength. Grating 20 could be replaced by any suitable means for separating or dispersing the optical signal emanating from fiber 22 into a plurality of spatially separated wavelength components. Such wavelength disperser/ separator means could also consist of a passive optical device such as a prism, filter, wavelength coupler, zone plate or the like or an active device such as an acousto-optic modulator or the like. When transmission fiber 22 and multimode delay optical fiber 28 are properly oriented with respect to lens 21, light beam 23 emanating from single-mode transmission fiber 22 is collimated and is incident onto grating 20, and the spatially separated wavelength components of the dispersed input signal (dashed line beams 24, 25 and 26) are focused onto the endface 29 of multimode fiber 28. For the sake of simplicity only those portions of beams 24, 25 and 26 that emerge from lens 21 are shown. Beams 24, 25 and 26 represent light at wavelengths $\delta_1$, $\delta_2$ and $\delta_n$, respectively for the sake of the present discussion. The dispersion transformer may include a glass cylinder 34 to which lens 21 and grating 20 are affixed, or the lens and grating can be suitably supported in air. Fibers 22 and 28 can be mounted on an x-y-z positioner with their endfaces in a common plane. The fibers are carefully positioned so that the axis of fiber 22 falls on the focal point of lens 21. When fiber 28 is correctly positioned, wavelength components 24, 25 and 26 will be focused on endface 29.

Figure 2:
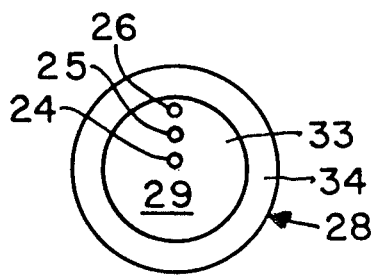
FIG. 2 shows the endface of a conventional multimode fiber which can be used in the dispersion transformer of FIG. 1.

If a single-core multimode fiber were employed, as disclosed in my aforementioned copending application Ser. No. 894,579 (V. A. Bhagavatula-5, U.S. Pat. No. 4,768,853, the endface thereof would appear as illustrated in FIG. 2 wherein core 33 and cladding 34 are shown. Circles 24, 25 and 26 represent the wavelength components generated by grating 20 and focused onto endface 29. Depending upon the specific light source employed at transmitter 10, the group of wavelength components can be a continuous spectrum of light or a discontinuous spectrum that results in a plurality of discrete beams.

In a production version of the dispersion transformer, fibers 22 and 28 could be potted or otherwise mounted in a plug which can be inserted into the transformer housing in such a location that the fiber endfaces are correctly positioned with respect to lens 21. The output from fiber 28 could be coupled by lens 30 to relay fiber 31, the output of which is directed upon receiver means 32.

Figure 3:
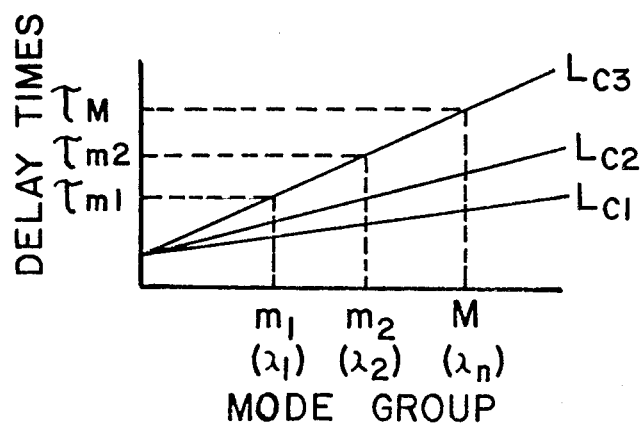
FIG. 3 is a graph of delay time plotted as a function of mode group for one type of multimode fiber.

Since each wavelength component falls at a different radial position on endface 29, each theoretically should excite a different mode group $m_1$, $m_2$, etc. If a single mode group were excited by a single wavelength component, the delay between mode groups $m_1$, $m_2$, etc. could be made to substantially compensate for the difference in delay times between $\delta_1$ and $\delta_2$, etc. generated in the transmission fiber by selecting the proper index profile and length of multimode fiber 28. For a step index fiber, for example, the delay time $\tau_m$ varies linearly as a function of (m/M) to a first approximation, where "m" is the mode number and "M" is the highest mode group that can propagate in the multimode fiber. The maximum delay difference $\tau_{mM}$ that can be achieved in such a fiber (the difference in the delay time $\tau_M$ of the highest order mode group and the delay time $\tau_1$ of the lowest order mode group) can be changed simply by selecting different lengths $L_c$ of the multimode delay fiber. A schematic diagram of this is shown in FIG. 3 wherein mode group $m_1$ has a delay time $\tau_{m1}$, mode group $m_2$ has a delay time $\tau_{m2}$ etc., and the highest order mode group M has a delay time $\tau_M$ for a multimode fiber length $L_{c3}$. FIG. 3 also illustrates that mode group $m_1$ is excited by wavelength component $\delta_1$, etc. Shorter lengths $L_{c2}$ and $L_{c1}$ of multimode fiber will provide correspondingly smaller delay times for each mode group. Thus, this technique has the advantage of compensating different amounts of system delays by simply cutting multimode fibers to appropriate lengths.

Figure 4:
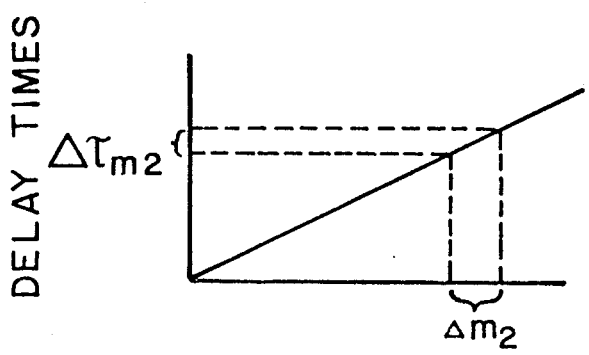
FIG. 4 is a graph illustrating the delay time difference resulting from non-selective mode excitation.

However, in the system of FIGS. 1 and 2 the spot size and divergence angle of each of the focused light beams 24, 25 and 26 is limited by the characteristics of transmission fiber 22 and by the system optics. Thus, the relationship between delay time and mode group (or wavelength component) may actually be as represented in FIG. 4. Due to one or more of the aforementioned reasons, wavelength component $\delta_2$ might excite a plurality of mode groups represented in FIG. 4 as $\Delta m_2$. Since the different modes within group $\Delta m_2$ propagate at different speeds, they are subjected to different delay times, and this pulse spreading is represented by $\Delta \tau_{m2}$. Although such a dispersion transformer system is capable of reducing dispersion which has occurred in transmission fiber 22, the extent to which dispersion is reduced is limited by the non-selective mode excitation problem depicted in FIG. 4. The bit rate that can be transmitted by the system is thus limited.

Selective mode excitation can be improved by using techniques such as the prism-coupling of light beams 24–26 into fiber 28, but such couplers are very inefficient. Other techniques for improving mode selectivity, such as the use of phase masks, are disclosed in my aforementioned patent application Ser. No. 894,579 (V. A. Bhagavatula 5), U.S. Pat. No. 4,768,853.

The dispersion transformer of the present invention employs a multimode delay fiber or planar waveguide having a plurality of independent core regions or light-conducting channels which permits the independent control of mode propagation. By exciting a small number of mode groups in each channel the pulse broadening therein can be kept small, thereby enabling the achievement of high bit rate transmission. Each channel can be designed to propagate a single mode, a few modes or more than a few modes. The channels can be designed such that the modes within each channel spread in time as little as possible, whereas different channels have different delay times. In addition, each of the channels is individually excitable.

Figure 5:
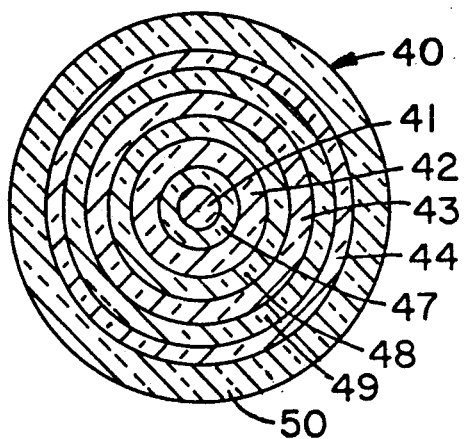
FIG. 5 is a cross-sectional view of an azimuthally symmetrical, multichannel, multimode optical fiber which can be used in the dispersion transformer of FIG. 1.
Figure 6:
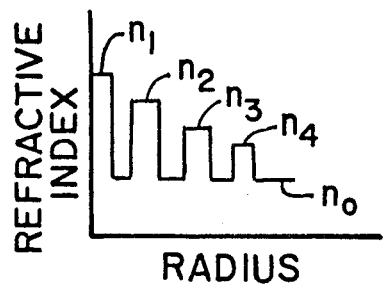
FIG. 6 is a graph of one of the refractive index profiles which can be employed.

An azimuthally symmetrical multi-channel optical fiber 40 is shown in FIG. 5. A central core 41 is surrounded by annular cores 42, 43 and 44. The aforementioned cores are separated by regions 47–49, respectively, of cladding glass, and fiber 40 is provided with outer cladding glass layer 50. The refractive index profile of fiber 40 may appear as shown in FIG. 6, wherein $n_1$, $n_2$, $n_3$ and $n_4$ are the refractive indices of cores 41, 42, 43 and 44, respectively, and n is that of cladding layers 47–50. The number of modes in each core or channel can be controlled by proper tuning of the refractive index of that channel, the refractive indices of the adjacent cladding regions, the radial width of the channel and the radius thereof. If the thickness of the cladding layers is great enough, each channel will function independently of the others, i.e. there will be no intermixing with signals in adjacent channels.

Figure 7:
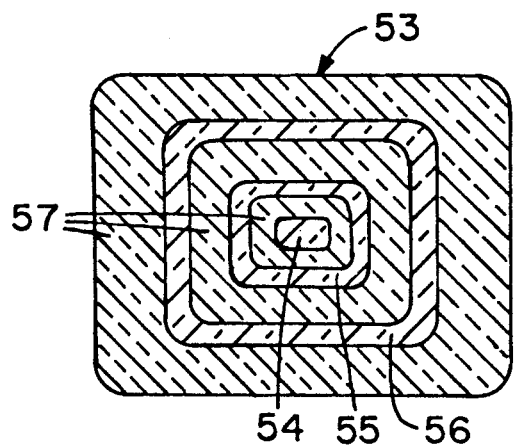
FIG. 7 and 8 illustrate other cross-sectional configurations for the multichannel multimode fiber.
Figure 8:
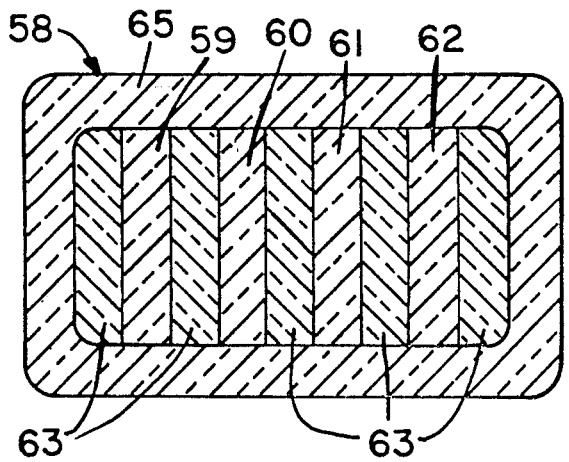

The light propagating channels can have various cross-sectional configurations, some of which are illustrated in FIGS. 7 and 8. Rectangular fiber 53 of FIG. 7 comprises core regions 54–56 and interleaved cladding regions 57 of lower refractive index. The number of modes per channel and the delay per channel can be controlled in the same manner as for fiber 40 of FIG. 5.

Slab-type fiber 58 of FIG. 8 comprises parallel slabs 59–62 of core material separated by cladding regions 63 of lower refractive index than the core material. Fiber 58 optionally comprises outer cladding layer 65 the refractive index of which is preferably equal to or greater than that of regions 63 but less than that of layers 59–62. The number of modes per channel and the delay per channel of fiber 58 can be controlled by varying the peak refractive index and width of each of the slabs 59–62 as well as the refractive index of cladding regions 63 and 65.

Figure 9:
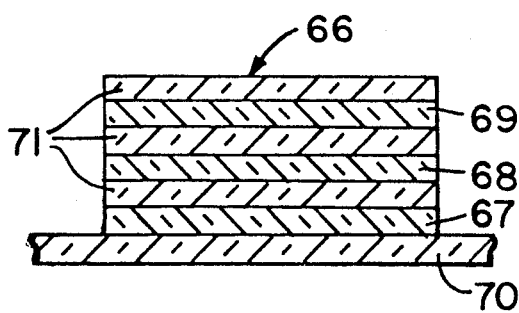
FIG. 9 is a cross-sectional view of a planar multimode delay optical waveguide.

Planar waveguide 66 of FIG. 9 is similar to the fiber of FIG. 8 except that the lamina are mounted on substrate 70 of lower index than lamina 67. Disposed on each of the light-conducting laminae 67, 68 and 69 is a cladding lamina 71 of lower refractive index than the light-conducting laminae. Because of the large values of $\Delta$ that can be obtained with planar structures, large delay differences can be achieved in relatively short lengths of waveguide.

Figure 10:
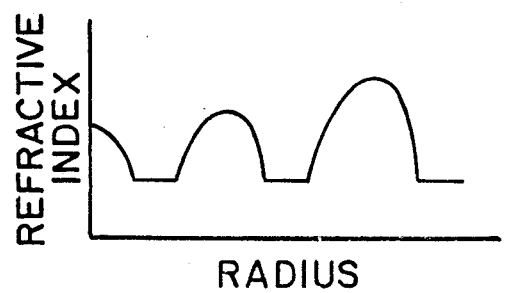
FIGS. 10–13 are refractive index profiles which illustrate some of the additional refractive index features that can be employed.

Even if a single light propagating channel supports more than one mode, all modes propagating in a single channel can be made to arrive at the output end of the compensating fiber at substantially the same time by grading the refractive index profile of each channel as shown in FIG. 10. The refractive index of each of the core regions 72–74 varies in accordance with the well-known equation $n(r)=n_o[1-\Delta(r/a)^\alpha]$ where $\alpha$ is near 2, i.e. their profiles are near parabolic. FIG. 10 also illustrates that the peak refractive indices of the core regions may increase with radius.

Figure 11:
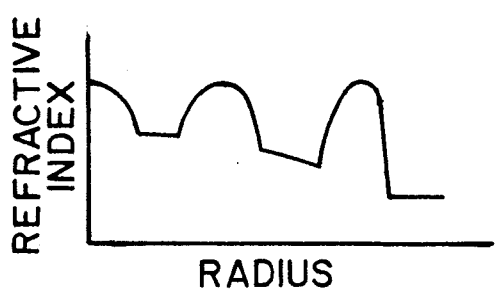
Figure 12:
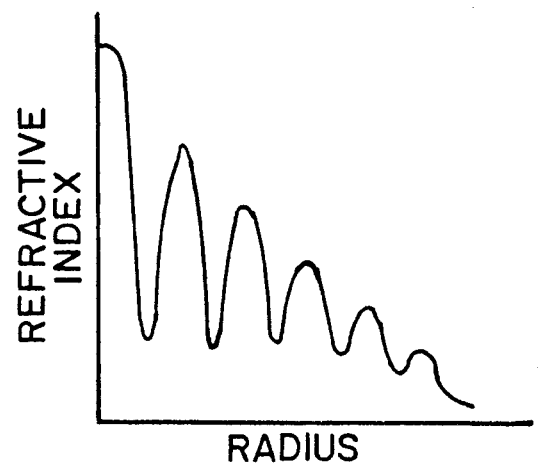
Figure 13:
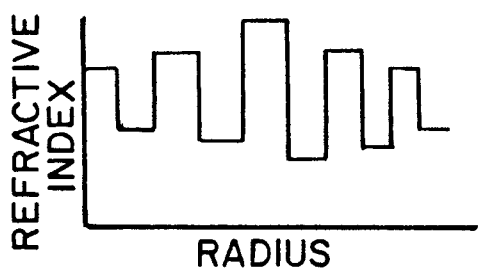

Many other refractive index profiles will also result in the existence of a plurality of distinct channels each of which propagate one or more modes at different delay times. For example, the fiber represented by FIG. 11 comprises a plurality of concentric channels, each having the same peak refractive index. However, the cladding regions between those channels exhibit refractive indices which decrease with increasing radius. FIG. 12 illustrates the case where both the peak refractive indices of the light propagating channels and the refractive indices of the cladding regions can vary with radius. As shown in FIG. 13, some circumstances may require that the peak refractive indices of the light conducting channels initially have a first relationship with radius (possibly increasing) and then a second relationship (possibly decreasing).

Whereas the refractive index profiles of FIGS. 6 and 10–13 are all plotted as a function of radius, it is intended that such profiles are equally applicable to the slab-type fiber of FIG. 8 and the planar waveguide of FIG. 9. For example, the refractive indices of core regions 59, 60, 61 and 62 of fiber 58 could be $n_1$, $n_2$, $n_3$ and $n_4$, respectively, reference being made to FIG. 6.

In a specific example of a dispersion reducing system, a lens 21 with a 1 cm focal length in combination with a 600 line per mm grating can provide a linear resolution of about 0.1 nm/μm on the endface of a multichannel optical fiber. Referring to FIG. 5, for example, a wavelength range of up to 20 nm could be achieved if the outer radius of channel 44 were 200 μm. If the refractive indices of the channels decreased radially as shown in FIG. 6, the delay difference between channel 41 and channel 44 would be about 28 ns/km, where the Δ values of channels 41 and 44 are 1.0% and 0.15%, respectively. The Δ values of intermediate channels 42 and 43 taper between the Δ values of channels 41 and 44. Therefore, the delay times of channels 42 and 43 would be intermediate those of channels 41 and 44.

The length of the multichannel fiber would depend on the specifics of the system. For a fiber system with a dispersion of about 20 ps/km nm over a 25 km repeater spacing, the delay time to be compensated is 500 ps per nm of spectral coverage required. For a coverage of 20 nm, the total delay compensation required is 10 ns. For a multimode fiber like the multichannel fiber discussed above with a delay difference of about 28 ns/km, about 360 m of the multichannel fiber would be required to compensate the system delay.

Figure 14:
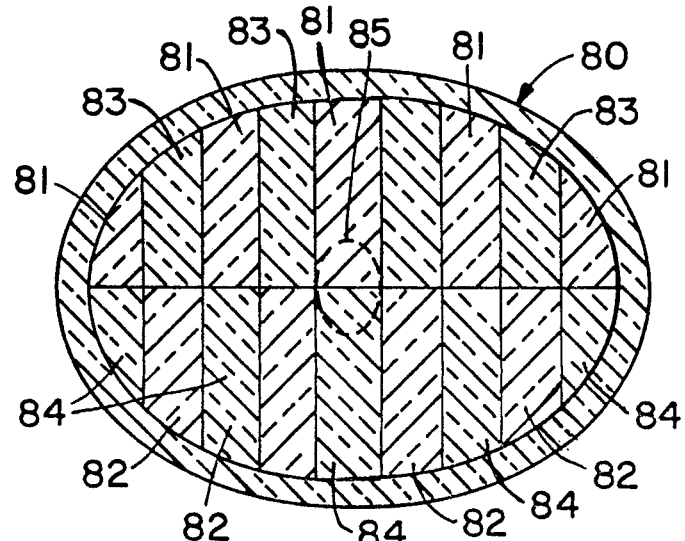
FIG. 14 is a cross-sectional view of a slab-type optical fiber having two sections, the core portions in the two sections being staggered.

There is a possibility that a wavelength component impinging on the endface of the multichannel fiber will fall on the cladding region between two high index slabs or rings and be lost. This problem can be eliminated by employing one of the techniques disclosed in my aforementioned patent application Ser. No. 894,631 (V. A. Bhagavatula 6), U.S. Pat. No. 4,750,802. For example, slab-type fiber 80 of FIG. 14 is formed of two sections. The light propagating regions 81 of the first section are offset with respect to the light propagating regions 82 of the second section. Regions 83 and 84 of low index material are interleaved between regions 81 and 82, respectively. A light beam 85 falling on the center line between the first and second sections may impinge primarily upon a cladding region 83 of the first region and yet not be lost since it also impinges upon a light propagating region 82 of the second region.

Figure 15:
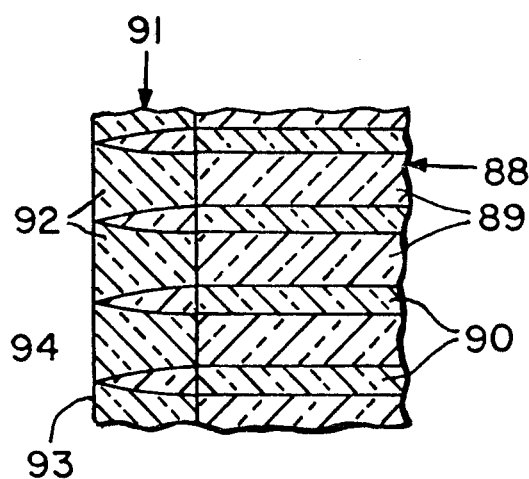
FIGS. 15 and 16 are cross-sectional views of input transition regions for multi-channel, multimode optical fibers.

FIG. 15 shows a slab-type fiber 88 comprising regions 89 and 90 of high and low refractive index, respectively. An input transition region 91 is located adjacent the input endface of fiber 88. Transition region cores 92 taper from a relatively large cross-sectional area at endface 93 down to an area that is about the same as that of cores 89 or smaller. Cladding layers taper from a relatively small thickness or zero thickness at endface 93 to a greater thickness at the interface between transition region 91 and fiber 88.

Transition region 91 could be formed of a single sheet of photosensitive material such as photosensitive glass or plastic which is sensitive to a particular wavelength of light such as ultraviolet. Light to which the sheet is sensitive is propagated through all light conducting channels 89 of fiber 88 and impinges upon the photosensitive sheet which is placed adjacent thereto as shown in FIG. 14. The diverging light emanating from channels 89 propagates through regions 92 and increases the refractive index thereof, thus forming light propagating cores 92. The refractive index of the unexposed regions remains relatively low, thus forming cladding regions 94. An annular input transition region could be similarly made for use with an azimuthally symmetrical optical fiber.

Figure 16:
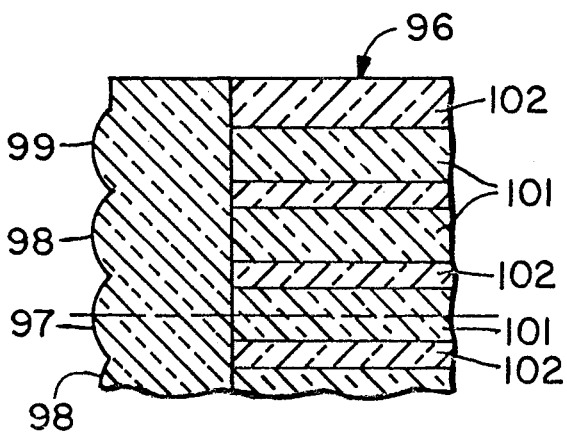

In the embodiment of FIG. 16 azimuthally symmetrical fiber 96 is provided with a lens system comprising annular lenses 97, 98 and 99 which are symmetrical about fiber axis 100. Light impinging on the lenses is focused onto one or more of the core regions 101 of fiber 96. Since no light is focused on cladding regions 102 of fiber 96, substantially all of the light impinging upon the lens system excites the propagation of modes in fiber 96.

I claim:

1. An optical fiber transmission system dispersion transformer comprising a multimode optical waveguide having an input endface and an output endface, and means for dispersing a light beam into a plurality of spatially separated beams and for directing said beams onto a portion of said input endface, said multimode optical waveguide being characterized in that it comprises a plurality of light-conducting channels, adjacent ones of which are separated by cladding regions having refractive indices lower than those of said light conducting channels, said multimode optical waveguide being a planar structure having a substrate on which there is disposed a plurality of light conducting laminae, adjacent ones of which are separated by a cladding lamina of lower refractive index than said light conducting laminae.

2. An optical fiber transmission system dispersion transformer comprising a multimode optical waveguide having an input endface and an output endface, and means for dispersing a light beam into a plurality of spatially separated beams and for directing said beams onto a portion of said input endface, said multimode optical waveguide being characterized in that it comprises an optical fiber having a plurality of light-conducting channels, adjacent ones of which are separated by cladding regions having refractive indices lower than those of said light conducting channels, said multimode optical waveguide being a slab-type optical fiber in which said channels are parallel laminae.

3. An optical fiber transmission system dispersion transformer comprising a multimode optical waveguide having an input endface and an output endface, and means for dispersing a light beam into a plurality of spatially separated beams and for directing said beams onto a portion of said input endface, said multimode optical waveguide being characterized in that it comprises an optical fiber having a plurality of light-conducting channels, adjacent ones of which are separated by cladding regions having refractive indices lower than those of said light conducting channels, wherein the refractive index profiles of at least one of said light-conducting channels is graded so that all modes are propagated therethrough with substantially the same delay.

4. An optical fiber transmission system dispersion transformer comprising a multimode optical waveguide having an input endface and an output endface, and means for dispersing a light beam into a plurality of spatially separated beams and for directing said beams onto a portion of said input endface, said multimode optical waveguide being characterized in that it comprises an optical fiber having a plurality of light-conducting channels, adjacent ones of which are separated by cladding regions having refractive indices lower than those of said light conducting channels, the refractive index profiles of each of said light-conducting channels being graded, the central region of each of said channels having a higher refractive index than the outer regions thereof, so that all modes propagating within a given channel experience the same delay.

5. In an optical transmission system comprising the serial arrangement of the following optical components a light source for generating an optical signal having a plurality of wavelengths, a light detector, at least one transmission optical fiber connected between said source and detector, and a dispersion compensator disposed between any two of the aforementioned optical components, said dispersion compensator comprising a multimode optical waveguide, means receiving light from one of said optical components and dispersing said light into an array of wavelength components, the position of each of said wavelength components being a function of the velocity with which the light that forms said wavelength component propagates through said at least one transmission optical waveguide, said means for receiving also directing said wavelength components onto a portion of an input endface of said multimode waveguide, the light emanating from said multimode waveguide being coupled to the next adjacent optical component of said system, said multimode optical waveguide being characterized in that it comprises a plurality of light-conducting channels, adjacent ones of which are separated by cladding regions having refractive indices lower than those of said light-conducting channels, the propagation characteristics of said channels being such that the wavelength component that propagates with the least delay through said transmission optical fiber is subjected to the most delay in the channel through which it propagates whereby said dispersion compensator substantially compensates for wavelength dispersion characteristics of said transmission optical fiber, said multimode optical waveguide being a planar structure having a substrate on which there is disposed a plurality of light conducting laminae, adjacent ones of which are separated by a cladding lamina of lower refractive index than said light conducting laminae.

6. In an optical transmission system comprising the serial arrangement of the following optical components a light source for generating an optical signal having a plurality of wavelengths, a light detector, at least one transmission optical fiber connected between said source and detector, and a dispersion compensator disposed between any two of the aforementioned optical components, said dispersion compensator comprising a multimode optical waveguide, means receiving light from one of said optical components and dispersing said light into an array of wavelength components, the position of each of said wavelength components being a function of the velocity with which the light that forms said wavelength component propagates through said at least one transmission optical waveguide, said means for receiving also directing said wavelength components onto a portion of an input endface of said multimode waveguide, the light emanating from said multimode waveguide being coupled to the next adjacent optical component of said system, said multimode optical waveguide being characterized in that it comprises an optical fiber having a plurality of light-conducting channels, adjacent ones of which are separated by cladding regions having refractive indices lower than those of said light-conducting channels, the propagation characteristics of said channels being such that the wavelength component that propagates with the least delay through said transmission optical fiber is subjected to the most delay in the channel through which it propagates whereby said dispersion compensator substantially compensates for wavelength dispersion characteristics of said transmission optical fiber, said multimode optical fiber being a slab-type fiber in which said channels are parallel laminae.

7. In an optical transmission system comprising the serial arrangement of the following optical components a light source for generating an optical signal having a plurality of wavelengths, a light detector, at least one transmission optical fiber connected between said source and detector, and a dispersion compensator disposed between any two of the aforementioned optical components, said dispersion compensator comprising a multimode optical waveguide, means receiving light from one of said optical components and dispersing said light into an array of wavelength components, the position of each of said wavelength components being a function of the velocity with which the light that forms said wavelength component propagates through said at least one transmission optical waveguide, said means for receiving also directing said wavelength components onto a portion of an input endface of said multimode waveguide, the light emanating from said multimode waveguide being coupled to the next adjacent optical component of said system, said multimode optical waveguide being characterized in that it comprises an optical fiber having a plurality of light-conducting channels, adjacent ones of which are separated by cladding regions having refractive indices lower than those of said light-conducting channels, the propagation characteristics of said channels being such that the wavelength component that propagates with the least delay through said transmission optical fiber is subjected to the most delay in the channel through which it propagates whereby said dispersion compensator substantially compensates for wavelength dispersion characteristics of said transmission optical fiber, the refractive index profiles of at least one of said light-conducting channels being graded so that all modes are propagated therethrough with substantially the same delay.

8. In an optical transmission system comprising the serial arrangement of the following optical components a light source for generating an optical signal having a plurality of wavelengths, a light detector, at least one transmission optical fiber connected between said source and detector, and a dispersion compensator disposed between any two of the aforementioned optical components, said dispersion compensator comprising a multimode optical waveguide, means receiving light from one of said optical components and dispersing said light into an array of wavelength components, the position of each of said wavelength components being a function of the velocity with which the light that forms said wavelength component propagates through said at least one transmission optical waveguide, said means for receiving also directing said wavelength components onto a portion of an input endface of said multimode waveguide, the light emanating from said multimode waveguide being coupled to the next adjacent optical component of said system, said multimode optical waveguide being characterized in that it comprises an optical fiber having a plurality of light-conducting channels, adjacent ones of which are separated by cladding regions having refractive indices lower than those of said light-conducting channels, the propagation characteristics of said channels being such that the wavelength component that propagates with the least delay through said transmission optical fiber is subjected to the most delay in the channel through which it propagates whereby said dispersion compensator substantially compensates for wavelength dispersion characteristics of said transmission optical fiber, the refractive index profiles of each of said light-conducting channels being graded, the central region of each of said channels having a higher refractive index than the outer regions thereof, so that all modes propagating within a given channel experience the same delay.

* * * * *

UNITED STATES PATENT AND TRADEMARK OFFICE
CERTIFICATE OF CORRECTION

PATENT NO. : 4,953,947
DATED : September 4, 1990
INVENTOR(S) : Venkata A. Bhagavatula It is certified that error appears in the above-identified patent and that said Letters Patent is hereby corrected as shown below:

Column 4, line 28, "$\delta_1, \delta_2$ and $\delta_n$" should be -- $\lambda_1, \lambda_2$ and $\lambda_n$ --.

Column 4, line 64, "$\delta_1$ and $\delta_2$" should be -- $\lambda_1$ and $\lambda_2$ --.

Column 5, line 13, "$\delta_1$" should be -- $\lambda_1$ --.

Column 5, line 26, "$\delta_2$" should be -- $\lambda_2$ --.

Column 5, line 66, "n" should be -- $n_o$ --.

Signed and Sealed this

Twenty-first Day of May, 1991

Attest:

HARRY F. MANBECK, JR.

Attesting Officer    Commissioner of Patents and Trademarks